US008001428B2

(12) United States Patent
Ashfield et al.

(10) Patent No.: US 8,001,428 B2

(45) Date of Patent: Aug. 16, 2011

(54) PACKING TRACE PROTOCOLS WITHIN TRACE STREAMS

(75) Inventors: Edmond John Simon Ashfield, Cambridge (GB); Andrew Brookfield Swaine, Cambridge (GB)

(73) Assignee: ARM Limited, Cambridge (GB)

( * ) Notice: Subject to any disclaimer, the term of this patent is extended or adjusted under 35 U.S.C. 154(b) by 309 days.

(21) Appl. No.: 12/289,404

(22) Filed: Oct. 27, 2008

(65) Prior Publication Data

US 2009/0132863 A1 May 21, 2009

Related U.S. Application Data

(60) Provisional application No. 60/983,464, filed on Oct. 29, 2007.

(51) Int. Cl.
*G06F 11/00* (2006.01)

(52) U.S. Cl. ........................................... 714/45; 714/18

(58) Field of Classification Search .................... 714/18, 714/45

See application file for complete search history.

(56) References Cited

U.S. PATENT DOCUMENTS

| | | | | |
|---|---|---|---|---|
| 6,321,290 | B1 * | 11/2001 | Yamashita | 711/100 |
| 6,615,370 | B1 * | 9/2003 | Edwards et al. | 714/45 |
| 6,732,307 | B1 * | 5/2004 | Edwards | 714/724 |
| 6,918,065 | B1 * | 7/2005 | Edwards et al. | 714/45 |
| 7,057,203 | B2 | 6/2006 | Mao et al. | |
| 7,149,933 | B2 | 12/2006 | Swaine et al. | |
| 7,206,734 | B2 * | 4/2007 | Swoboda | 703/26 |
| 7,209,058 | B2 * | 4/2007 | Swoboda | 341/63 |
| 7,318,017 | B2 * | 1/2008 | Swoboda | 703/28 |
| 7,346,758 | B1 * | 3/2008 | Baring-Gould et al. | 711/207 |
| 7,463,653 | B2 * | 12/2008 | Swoboda et al. | 370/503 |
| 7,555,681 | B2 * | 6/2009 | Swoboda | 714/45 |
| 7,555,682 | B2 * | 6/2009 | Swoboda | 714/45 |
| 7,562,259 | B2 * | 7/2009 | Swoboda | 714/45 |
| 7,590,893 | B2 * | 9/2009 | Swoboda | 714/45 |
| 7,590,912 | B2 * | 9/2009 | Swoboda | 714/733 |
| 7,681,084 | B2 * | 3/2010 | Swoboda | 714/45 |
| 7,702,964 | B2 * | 4/2010 | John | 714/45 |
| 7,721,167 | B1 * | 5/2010 | Azimi et al. | 714/724 |
| 7,739,669 | B2 * | 6/2010 | Swoboda | 717/128 |
| 7,770,066 | B2 * | 8/2010 | Mun | 714/28 |
| 2001/0034597 | A1 * | 10/2001 | Swoboda et al. | 703/26 |
| 2002/0055828 | A1 * | 5/2002 | Swoboda et al. | 703/13 |
| 2002/0055830 | A1 * | 5/2002 | Swoboda et al. | 703/19 |
| 2002/0055831 | A1 * | 5/2002 | Swoboda | 703/19 |
| 2002/0065642 | A1 * | 5/2002 | Swoboda | 703/19 |
| 2002/0069042 | A1 * | 6/2002 | Swoboda | 703/19 |
| 2002/0111785 | A1 * | 8/2002 | Swoboda et al. | 703/28 |

(Continued)

*Primary Examiner* — Robert W Beausoliel, Jr.
*Assistant Examiner* — Joshua P Lottich
(74) *Attorney, Agent, or Firm* — Nixon & Vanderhye P.C.

(57) ABSTRACT

A data processing apparatus is provided with packing circuitry 130 arranged to receive said source data elements from said trace data receiver and applies a packing protocol to said source data elements to pack data of source data elements of a source trace stream into a packed trace data stream for supply to trace accepting circuitry in a format comprising acceptance data elements. The acceptance data elements have a bit-length that is not a factor of the source data element bit-length. In some arrangements the source data elements are non byte-sized data elements. In alternative arrangements, the packing circuitry packs a first positive integer number of source data elements into a data chunk comprising a second, different positive integer number of acceptance data elements. In further alternative arrangements the source trace protocol has a variable packet size and the data chunk is formed from a first portion comprising data of the source data elements and a further portion comprising a size-indicating code.

39 Claims, 9 Drawing Sheets

U.S. PATENT DOCUMENTS

2002/0178405 A1* 11/2002 McCullough et al. .......... 714/45
2004/0078690 A1* 4/2004 Kohashi .......................... 714/38
2004/0117717 A1* 6/2004 Swoboda ...................... 714/776
2006/0136801 A1* 6/2006 Hickey et al. ................. 714/781
2006/0195311 A1* 8/2006 Swoboda et al. ............... 703/26
2006/0255972 A1* 11/2006 Swoboda ........................ 341/50
2006/0255977 A1* 11/2006 Swoboda ........................ 341/50
2007/0150255 A1* 6/2007 Swoboda et al. ............... 703/26
2007/0234191 A1* 10/2007 Hickey et al. ................. 714/799
2008/0028114 A1* 1/2008 Mun ............................. 710/105
2008/0148135 A1* 6/2008 Hughes et al. ................ 714/799
2008/0155351 A1* 6/2008 Flake .............................. 714/45
2008/0250275 A1* 10/2008 Walker et al. ................... 714/45
2008/0256396 A1* 10/2008 Giannini et al. ................ 714/45
2009/0049342 A1* 2/2009 Dickenson et al. ............. 714/45
2009/0094487 A1* 4/2009 Flake .............................. 714/45
2009/0150728 A1* 6/2009 Barlow et al. ................. 714/718
2009/0216521 A1* 8/2009 Swoboda et al. ............... 703/26
2010/0153784 A1* 6/2010 Inoue et al. ..................... 714/38

* cited by examiner

| | | |
|---|---|---|
| | 1ddddddd | 7 bits of data |
| | 01dddddd | 6 bits of data |
| | 001ddddd | 5 bits of data |
| | 0001dddd | 4 bits of data |
| | 00001ddd | 3 bits of data |
| | 000001dd | 2 bits of data |
| | 0000001d | 1 bit of data |
| 810 | 00000001 | reserved |
| 812 | 00000000 | reserved |

FIG. 8A

| | | | |
|---|---|---|---|
| | 1ddddddd | dddddddd | 15 bits of data |
| | 01dddddd | dddddddd | 14 bits of data |
| | . . . | | |
| | 00000000 | 0000001d | 1 bit of data |
| 822 | 00000000 | 00000001 | reserved |
| 824 | 00000000 | 00000000 | reserved |

FIG. 8B

| | | |
|---|---|---|
| {dddddddd}^n | ddddddd1 | 8n+7 bits of data (where n defined in advance) |
| 830 | dddddd10 | 6 bits of data |
| | ddddd100 | 5 bits of data |
| | dddd1000 | 4 bits of data |
| | ddd10000 | 3 bits of data |
| | dd100000 | 2 bits of data |
| | d1000000 | 1 bit of data |
| | 10000000 | reserved |
| | 00000000 | reserved |

FIG. 8C

| | | | |
|---|---|---|---|
| | {dddddddd}^n | ddddddd1 | 8n+7 bits of data (where n defined in advance) |
| 832 | dddddddd | dddddd10 | 14 bits of data |
| | | ddddd100 | 5 bits of data |
| | | dddd1000 | 4 bits of data |
| | | ddd10000 | 3 bits of data |
| | | dd100000 | 2 bits of data |
| | | d1000000 | 1 bit of data |
| | | 10000000 | reserved |
| | | 00000000 | reserved |

FIG. 8D

PACKING TRACE PROTOCOLS WITHIN TRACE STREAMS

This application claims priority to U.S. Application No. 60/983,464, filed Oct. 29, 2007, the entire contents of each of which are hereby incorporated by reference.

BACKGROUND OF THE INVENTION

1. Field of the Invention

The present invention relates to the field of data processing systems. More particularly, this invention relates to a data processing system arranged to receive a source trace data stream corresponding to a source trace protocol and to supply the received trace data to trace accepting circuitry 2. Description of the Prior Art Many known data processing systems comprise trace data generating mechanisms. Examples of such systems are the Embedded Trace Macrocell designed by ARM Limited of Cambridge, England. Such trace mechanisms serve to monitor the data processing operations taking place on a data processing apparatus and to generate a trace data stream indicative of the data processing operations occurring, such as which instructions are being executed, and which data values are being manipulated. This source trace data stream is typically output (possibly after on-chip buffering) to trace data analysing circuitry such as a software diagnostic tool to assist a hardware designer or a programmer in debugging the data processing system.

As data processing systems increase in complexity, it is becoming common to use System-on-chip (SOC) designs that typically contain many different data processing elements, each performing its own data processing operations in communication with other data processing elements. As an example, a single integrated circuit may include a processor core, a digital signal processor and a memory system. Each of these elements can be separately subject to tracing and can generate its own individual trace data stream. Each of these plurality of trace data streams can potentially have a respective different trace protocol according to which the trace data is formatted. Providing separate trace mechanisms for each trace data source can disadvantageously consume pin count and separate inputs and outputs need to be provided for each trace data source. Accordingly, it is desirable in data processing systems comprising a plurality of trace data sources to generate a combined trace data stream comprising trace data from a plurality of trace data sources. This can present a difficulty since different source trace protocols associated with a different trace data sources may have different and incompatible trace data formats Furthermore, even in a data processing system comprising a single trace data source, it may be required to supply a source data stream to trace accepting circuitry for further analysis and the trace accepting circuitry may be configured to accept trace data in a predetermined format that is incompatible with the format specified by the source trace protocol. Accordingly, there is a requirement for a data processing system that enables trace data to be output for analysis in a more flexible format.

SUMMARY OF THE INVENTION

Viewed from one aspect the present invention provides apparatus for processing data comprising a trace data receiver for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing circuitry is arranged to pack a first positive integer number of said source data elements into a respective data chunk comprising a second positive integer number of said acceptance data elements, said packing being such that said second positive integer number is different from said first positive integer number and wherein said packing circuitry is arranged to perform said packing such that said source data elements are recoverable from said packed trace data stream by trace data analysing circuitry.

The present invention provides a mechanism whereby a given source trace data stream can be converted into a packed trace data stream for supply to trace accepting circuitry in a format that differs from the format of the source trace protocol such that the packed trace data stream comprises acceptance data elements having a bit-length that is not a factor of the source data element bit-length corresponding to the source trace protocol. The packing within the packed trace data stream is such that the number of source data elements packed into a respective data chunk on the packed trace data stream is different from the number of acceptance data elements in the data chunk, where both numbers are positive integers. The present invention recognises that packing data of source data elements of the source trace protocol into acceptance data elements of data chunks of a packing protocol provides a great deal of flexibility in reformatting a source trace data stream into a different format suitable for processing downstream by a trace data analysing circuitry, yet the packing is performed such that the original source data elements associated with the source trace protocol are readily recoverable from the packed data stream by trace data analysing circuitry. This enables trace data from various different trace data sources, complying with respective different source trace protocols, to be packed into a predetermined format defined by a packing protocol as required by trace processing circuitry.

It will be appreciated that the number of source data elements that are packed into a data chunk of the packed trace data stream can vary according to the currently available data within the source trace data stream. However, in one embodiment the first positive integer number corresponding to the number of source data elements in a respective data chunk of the packed trace data stream is one and the second positive integer number corresponding to the number of source data elements that are packed into the respective data chunk is a positive integer greater than one. In an alternative embodiment the first positive integer number is a positive integer greater than one whereas the second positive integer number is one.

It will be appreciated that data of the source data elements of the source trace data stream could be packed into the packed trace data stream in a variety of different ways and could, for example, be interleaved with other data such as control data etc. However, in one embodiment, the packing circuitry is arranged to contiguously pack a plurality of source data elements into the respective data chunk of the packed trace data stream. This represents an efficient way of packing the data of the source data elements and provides for efficient use of bandwidth and facilitates downstream extraction of the source data elements by trace data handling circuitry.

Although it is possible to arrange that boundaries between respective data chunks of the packed trace data stream be coincident with packet boundaries of the source trace data stream, in one embodiment the packing circuitry is arranged to form the packed data stream such that a boundary of the data chunk is permitted to be non-coincident with the packet boundary between adjacent ones of the plurality of packets of the source trace data stream. This provides more variation in the manner in which the packing of data of the source data elements of the source trace data stream can be performed and makes the packing more straightforward to implement.

It will be appreciated that the second positive integer number of acceptance data elements comprising the data chunk of the packed trace data stream could be arranged such that it is a predetermined number for every data chunk. However, according to one embodiment, the packing circuitry is arranged to vary the second positive integer number of acceptance data elements in the data chunk in dependence upon a number of the source data elements currently available to the packing circuitry. This makes the packing circuitry highly adaptable to prevailing conditions in the trace data receiver and avoids undue delay in output of the data of the source trace data stream in situations where the number of available source data elements is likely to vary.

It will be appreciated that the packing circuitry could be arranged to form data chunks comprising only data from the source data elements of the source trace data stream together with any control information. However, in one embodiment, the packing circuitry is arranged to insert in a given data chunk at least one padding bit in addition to data of the source data element to form a data chunk having a predetermined bit-length. This enables formatting requirements of the packing protocol to be adhered to even when the number of bits of data in the available source data elements is not sufficient to completely fill a data chunk of a predetermined size.

It will be appreciated that some trace protocols do not support null packets or ignore packets. However, in one embodiment the packing protocol does support null packets and the at least one padding bit included in the data chunk comprises a null packet of the packing protocol. This provides a convenient way in which to insert padding bits into data chunks.

It will be appreciated that the data processing apparatus could provide control information, which indicates the number of bits of data from the source data elements that are included in the given data chunk, in a variety of different ways. However, in one embodiment, the packing circuitry is arranged to insert in the packed trace data stream a continuation bit between adjacent ones of the plurality of source data elements of a given data chunk. This provides a convenient mechanism via which to signal to trace data analysing circuitry that further source data elements are to be transmitted within the given data chunk. Thus the continuation bit facilitates correlation of data of the source is data stream.

It will be appreciated that the continuation bit could be transmitted prior to transmitting the corresponding source data element, but in one embodiment the continuation bit is transmitted after transmission of the corresponding source data element.

Considering embodiments where the packing circuitry is arranged to insert a continuation bit between adjacent ones of the source data elements of a given data chunk, some such embodiments have packing circuitry that is also arranged to insert in a given data chunk at least one padding bit in addition to data of the source data elements in order to form a data chunk having a predetermined bit-length. This provides more flexibility in the options for packing data of the source data element into the data chunks of the packing protocol.

In some such embodiments where the packing circuitry is capable of inserting continuation bits and at least one padding bit, the packing circuitry is also arranged to insert in the data chunk comprising at least one padding bit, a data-end indicator indicating a boundary between data of the source data element and the at least one padding data bit within a given data chunk. This provides a straight-forward way of indicating to trace data analysing circuitry which bits of the data chunk can be ignored and which bits of the data chunk should be subject to analysis.

Although it will be appreciated that the data-end indicator and the padding data bits could take a variety of different forms, in one embodiment the data-end indicator is a 0-bit and the at least one padding data bit is a 1-bit. The use of 1-bits as padding bits effectively sets an upper limit on the number of consecutive zero bits in a sequence of packets and thus is less likely to interfere with protocol alignment synchronisation sequences of known trace protocols, which typically comprise sequences having a plurality of consecutive zero bits.

In embodiments where the packing circuitry is arranged to insert a continuation bit between source data elements of a given data chunk and where the packing protocol supports null packets, the continuation bit can be arranged by the packing circuitry such that it corresponds to the plurality of the source data elements of a given data chunk rather than corresponding to continuation of a single source data element by a subsequent source data element. This reduces the overhead of inclusion of the continuation bits, particularly in the case where the source trace data protocol comprises small packets.

It will be appreciated that the data chunk may take a number of different forms, but in one embodiment, the packing circuitry is arranged to generate the data chunk such that it is formed from a first portion comprising a variable-length indicator pattern and a second portion comprising data of the source data elements of the source trace protocol. The variable-length indicator pattern provides a convenient mechanism for specifying how many bits of the source data elements are contained within a data chunk. The encodings of the variable-length indicator pattern can be conveniently chosen to pack certain quantities of data bits of the source trace data stream into a smaller quantity of bytes in the data chunk of the packing protocol. In some such embodiments, the variable-length indicator pattern is indicative that a pre-determined number of bits of data of the source data elements are contained within a corresponding data chunk.

In some such embodiments having variable-length indicator patterns in the data chunk, the data chunk comprises at least one padding bit in addition to both the variable-length indicator pattern and the bits of the source data element. It will be appreciated that the protocol alignment and the packet alignment within the packed trace data stream could be indicated to the trace data analysing circuitry in a number of different ways. However, in one embodiment, the packing protocol comprises unused encodings and the packing circuitry is arranged to generate the packed trace data stream such that the unused encodings are used by the trace data analysing circuitry to determine at least one of the protocol alignment and the packet alignment within the packed trace data stream to enable recovery of the source data elements from the packed trace data stream. In an alternative embodiment, the packing protocol comprises reserved encodings and the reserved encodings are used by the trace data analysing circuitry to determine at least one of the protocol alignment and the packet alignment within the packed trace data stream.

Although the packing circuitry according to the present technique could be provided in the data processing apparatus comprising a single trace data receiver, in one embodiment the data processing apparatus comprises a plurality of trace data receivers each arranged to receive a respective plurality of source trace data streams having corresponding source trace protocols. The packing circuitry is arranged to form the packed trace data stream for at least one of the plurality of source data streams. The packing circuitry enables data corresponding to a source trace data stream the has a corresponding source trace protocol that is incompatible with other source trace protocols corresponding to other trace data receivers to be bought into conformity by forming a packed trace data stream that is compatible with the other trace protocols. This facilitates combined output of trace data from the plurality of source trace data streams for downstream analysis.

In one embodiment the data processing apparatus comprises: a trace data selector operable to select one of the plurality of source trace data streams as a selected trace data stream for output; and a trace data formatter operable to format the selected trace data stream to form an output trace data stream; wherein the trace data formatter is operable to detect which of the individual trace data sources is selected by the trace data selector and to insert a trace data source identifier in the output trace data stream in response to a change of trace data source selected by the trace data selector. This provides mechanism whereby trace data source identification is included within the output trace data stream in an efficient manner since the trace data source identifiers are inserted upon a trace data source change rather than with every trace data packet. Accordingly, a trace data analyser can assume that the trace data source remains unchanged until a new trace data source identifier is encountered within the output trace data stream. This saves bandwidth within the trace data stream. Furthermore, provision of the packing circuitry for conversion of a source trace data stream to a packed trace data stream enables the plurality of source trace data streams to be more conveniently combined in a single output trace data stream since the trace data formatter may require data to be input thereto in a predetermined format that differs from the format associated with the source trace protocol. Thus the packing circuitry can be arranged to convert a source trace data stream to a packed trace data stream for input to the trace data formatter.

In embodiments comprising a plurality of trace data receivers, a trace data selector, and a trace data formatter it will be appreciated that the packing circuitry could be provided in any one of a number of different locations. However, in one embodiment, the packing circuitry is provided as an integral part of one of the plurality of trace data sources.

In one embodiment having a trace data selector, a trace data formatter, and a plurality of trace data receivers, the trace accepting circuitry to which the packed data stream is supplied by the packing circuitry corresponds to the trace data formatter.

According to a second aspect the present invention provides apparatus for processing data comprising a trace data receiver for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said source data elements are non byte-sized data elements and wherein said packed trace data stream comprises one or more of said acceptance data elements and said packing circuitry is arranged to perform said packing such that said source data elements are recoverable from said packed trace data stream by trace data analysing circuitry.

According to this second aspect, the present invention recognises that there are many circumstances where a given source trace data stream may be in a format that is not suitable for supplying directly to trace data accepting circuitry that is configured to receive data elements having a given bit-length. In particular, trace accepting circuitry typically requires source data to be supplied in individual bytes or multiples of bytes. Thus provision of packing circuitry arranged to receive source data elements from a source trace data stream and to generate a packed trace data stream comprising acceptance data elements having a bit-length that is not a factor of the source data element bit-length enables non-standard sizes of source data elements (i.e. non byte-sized source data elements to be conveniently reformatted into a packed trace data stream having acceptance data elements) of a different bit-length. This facilitates compliance with known wrapping protocols, for example, wrapping protocols that pack individual bytes of data into frames of trace data for output to a trace data analyser.

According to a third aspect this invention provides apparatus for processing data comprising a trace data receiver for receiving a source trace data stream corresponding to a source trace protocol having a variable packet size, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing circuitry is arranged to pack data of at least one of said source data elements into a respective data chunk having a bit-length that is not a factor of said acceptance data-element bit-length, said data chunk being formed such that a first portion of said data chunk comprises a number of bits of data of said source data elements and a further portion of said data chunk comprises a size indicating code specifying a number of bits of said source data elements contained within said data chunk and wherein said packing circuitry is arranged to perform said packing such that said source data elements are recoverable from said packed trace data stream by trace data analysing circuitry.

According to this third aspect, the present invention recognises that a source trace data stream having a completely variable packet size can be reformatted by packing circuitry in an efficient manner by packing data of source data elements into data chunks of a packing protocol such that data chunks have a first portion comprising bits of the source data elements and a further portion comprising a size-indicating code specifying a number of bits of the source data elements contained within the data chunk. This provides a great deal of flexibility in accommodating variable packet sizes of the source trace data stream.

In some such embodiments the data chunk comprises a positive integer number of acceptance data elements, the positive integer being greater than 1. This reduces the overhead of the Size-indicating code in the data chunk. In other such embodiments the data chunk bit-length is 8-bits. This simplifies implementation of the packing protocol by providing a uniform data chunk bit-length.

In other such embodiments where the source trace protocol has a variable packet size, the data chunk comprises a positive integer n bytes of data within which is encoded up to (8n−1) bits of data of the source data elements.

It will be appreciated that in embodiments in which the source trace protocol has a variable packet size, data chunks generated by the packing circuitry could also have a completely variable bit-length. However, in one embodiment, the packing circuitry is arranged to output a plurality of said data chunks having a plurality of predetermined bit-lengths. This reduces the complexity of the packing protocol and makes the packing circuitry simpler to implement.

It will be appreciated that the size indicating portion of the data chunk could be selected any number of different ways, but in one embodiment the packed data stream is serially transmitted data stream and the packing circuitry is arranged to select the size indicating code portion of the data chunk in dependence upon an average frequency characteristic of the serially transmitted packed data stream. This provides more efficient use of transmission bandwidth.

Various other respective aspects and features of the invention are defined in the appended claims. These other aspects include data processing methods corresponding to each of the above three aspects of the invention and computer programs embodied on computer-readable media comprising computer program code for executing each of the three methods.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 8A to 8D schematically illustrate different implementations of a bit-field packing protocol.

DESCRIPTION OF THE PREFERRED EMBODIMENTS

Figure 1:
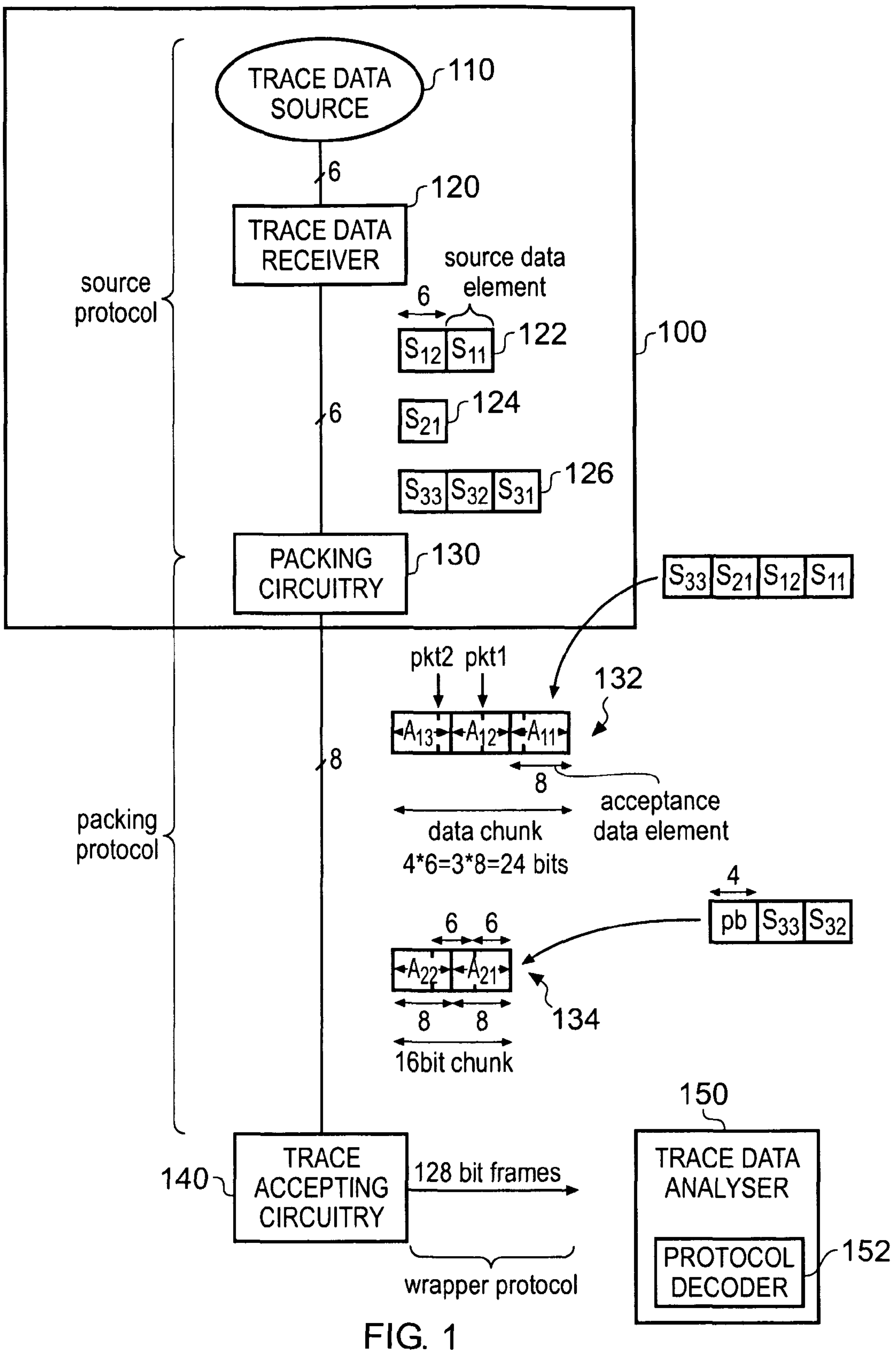
FIG. 1 schematically illustrates a data processing apparatus according to an embodiment of the present invention.

FIG. 1 schematically illustrates a data processing apparatus according to an embodiment of the present invention. The data processor 100 comprises a trace data source 110, a trace data receiver 120 and packing circuitry 130. The output of the data processor 100 is supplied to trace accepting circuitry 140 and subsequently to a trace data analyser 150 comprising a protocol decoder 152. The trace accepting circuitry 140 and the trace data analyser 150 in this embodiment are external to the data processor 100.

The trace data source 110 outputs to the trace data receiver 120 trace data providing performance analysis information with regard to data processing operations being executed on an associated data processing system. In the embodiment of FIG. 1, the data processor 100 is only one of a plurality of data processors provided on a single processor chip. For example, in one embodiment, the processor chip comprises processing circuitry (such as a central processing unit) in addition to the data processor 100 (comprising the trace data source 110, trace data receiver 120 and packing circuitry 130). In another embodiment, the processor chip comprises bus fabric in addition to the data processor 100. The trace data source 110 outputs data according to a given source trace protocol. The source trace protocol has an associated set of rules defining characteristics of packets of data representing some aspect of operation of the system. In particular, the source protocol defines the allowable bit-length of packets of trace data. In the example of FIG. 1, the trace data source 110 has a source protocol that allows packets of trace data that are positive integer multiples of six bits to be output, to the trace data receiver 120 and the trace data receiver 120 supplies the received trace data in accordance with the source trace protocol to the packing circuitry 130. Three example source trace packets are shown comprising a first packet 122 formed from two 6-bit source data elements $S_{11}$ and $S_{12}$. Thus the first packet 122 is a 12-bit packet comprising two source data elements. A second packet 124 comprises a single 6-bit source data element $S_{21}$ whilst a third source data packet 126 comprises three 6-bit source data elements $S_{31}$, $S_{32}$ and $S_{33}$ forming an 18-bit packet. The packing circuitry 130 receives the source protocol packets 122, 124 and 126 and packs data from the source data elements ($S_{11}$, $S_{12}$, $S_{21}$, $S_{31}$, $S_{32}$ and $S_{33}$ into a different format for output to the trace accepting circuitry 140. In particular, the packing circuitry packs the source data elements into a packed trace data stream in a format comprising data chunks, each of which comprises one or more acceptance data elements having a different format from the source data elements. In this particular embodiment, the acceptance data elements have a bit-length that is not a factor of the source data element bit-length.

In the embodiment of FIG. 1, the packing protocol has a characteristic acceptance data element bit-length of 8-bits. Two different data chunks 132, 134 output by the packing circuitry are illustrated in FIG. 1. Data chunk 132 comprises three 8-bit acceptance data elements $A_{11}$, $A_{12}$ and $A_{13}$ which are contiguously packed to form the data chunk. This data chunk 132 comprises the data from four of the individual source data elements of the source trace data stream. In particular, data chunk 132 comprises the source data elements $S_{11}$, $S_{12}$, $S_{21}$ and $S_{31}$ as shown. Thus the packing circuitry 130 has packed four 6-bit source data elements into a 24-bit data chunk 132 comprising three individual acceptance data elements $A_{11}$, $A_{12}$ and $A_{13}$. The second data chunk 134 is a 16-bit data chunk comprising data from the remaining two source data elements $S_{32}$ and $S_{33}$ of the three source protocol data packets 122, 124, 126. However, since the source data elements $S_{32}$ and $S_{33}$ are 6-bit data elements whilst the acceptance data element size is 8 bits, two acceptance data elements are required in order to contain the last of the two source data elements but an additional four padding bits are inserted in the 16-bit data chunk 134 to ensure that the data chunk has a size corresponding to a positive integer number of acceptance data elements. It can be seen that the packing circuitry 130 operates in accordance with a packing protocol having a characteristic data element size and outputs data chunks comprising positive integer multiples of the data element size. The trace accepting circuitry 140 receives data chunks from the packing circuitry and packs data from those data chunks into 128-bit frames in accordance with a wrapper protocol before supplying those data frames to the trace data analyser 150. The protocol decoder 152 within the trace data analyser is able to extract data from the 128-bit frames and to recover the 6-bit source data elements from these frames regardless of the fact that the source data elements were reformatted by the packing circuitry 130 into data chunks comprising 8-bit data elements prior to formation of the 128-bit frames. For example, the protocol decoder 152 identifies that there are 4 padding bits added at the top of the acceptance data element A22 in data chunk 134 of FIG. 1 by using a packing value of 4'b1111. This works because it is known that there is no source element of the form 6'bxx1111 with which the packing value might be confused.

The above described functions of the trace data receiver 120 and/or packing circuitry 130 can be performed at least in part using computer software to control a data processing apparatus. Indeed, the functions of the trace accepting circuitry 140 and/or trace data analyser can also be preformed, at least in part, using computer software.

Figure 2A:
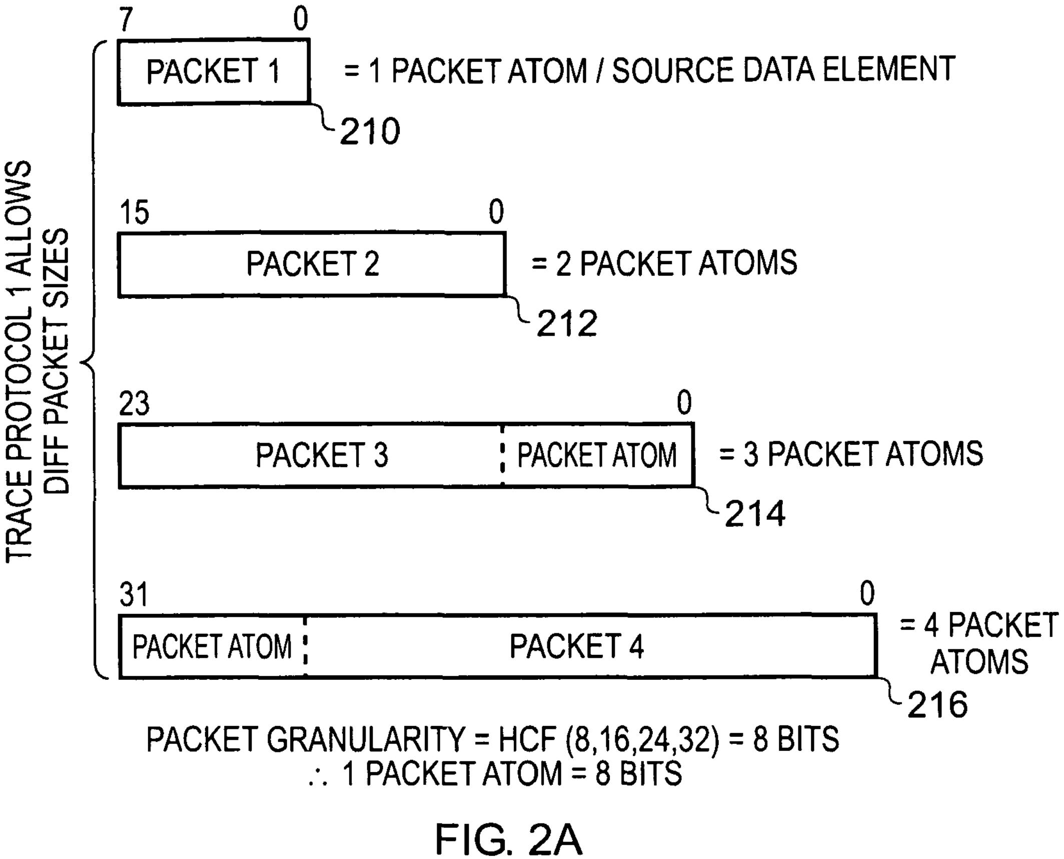
FIGS. 2A and 2B schematically illustrate two difference source trace protocols having different characteristics.
Figure 2B:
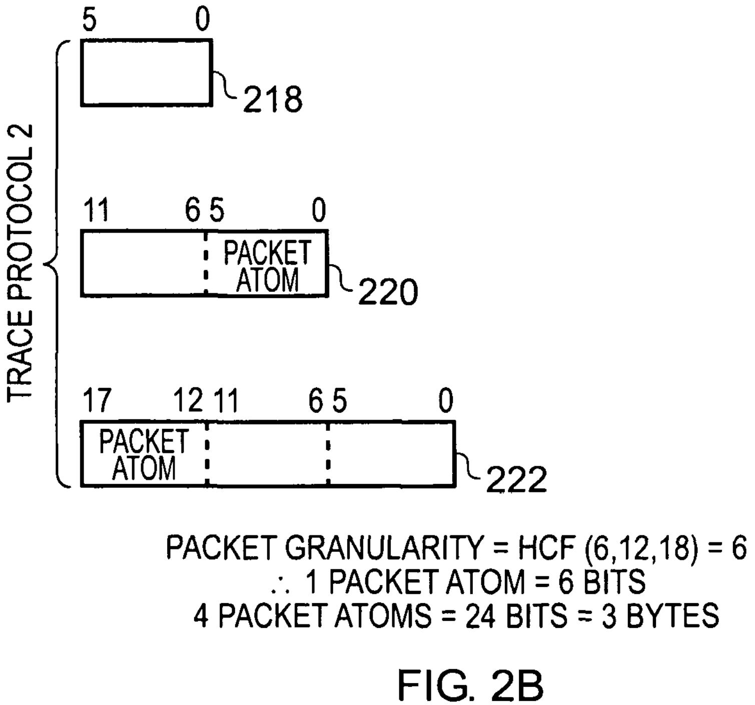

FIGS. 2A and 2B schematically illustrate two difference source trace protocols having different characteristics.

FIG. 2A shows a first trace source protocol in which the bit-length of the source data elements (or "packet atoms") is 8-bits. This first source trace protocol allows for packet sizes of 8 bits, 16 bits, 24 bits or 32 bits as shown. An 8-bit packet 210 comprises a single source data element; a 16-bit packet 212 comprises two 8-bit source data elements; a 24-bit packet 214 comprises three contiguously packed 8-bit source data elements; whilst a 32-bit packet 216 comprises four contiguously packed 8-bit source data elements. This first source trace protocol has a characteristic packet granularity (defined to be the highest common factor of a length in bits of every possible packet in the trace protocol). In this case the packet granularity is given by the highest common factor of 8, 16, 24 and 32 i.e. the packet granularity is 8 bits.

FIG. 2B schematically illustrates a second source trace protocol, which is defined such that it allows output of trace data packets comprising a 6-bit packet 218, a 12-bit packet 220 or an 18-bit packet 222. In this case the first packet 218 comprises a single 6-bit source data element, the packet 220 comprises two 6-bit source data elements whilst the third packet 222 comprises three 6-bit source data elements. In the protocol of FIG. 2B the packet granularity corresponds to the highest common factor of the three packet sizes of 6, 12 and 18 bits and thus the packet granularity is equal to six. Thus, according to this protocol, one packet atom comprises 6 bits which is equivalent to a source data element length of 6 bits.

In each of the source trace protocols the word packet is used to indicate a quantity of trace data having some meaning within the corresponding trace protocol. A packet may comprise one or more source data elements (or packet atoms).

Figure 3:
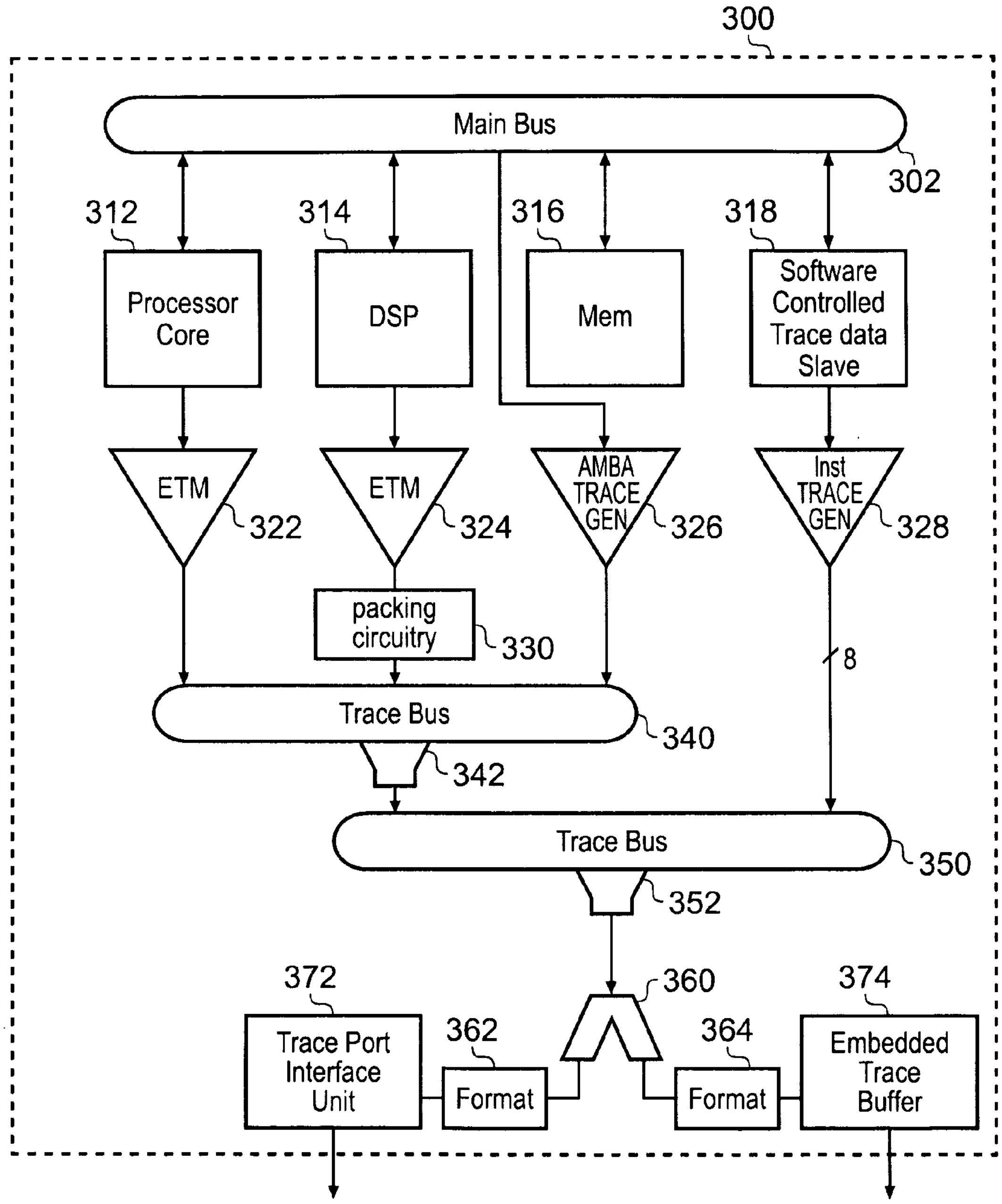
FIG. 3 schematically illustrates an integrated circuit comprising packing circuitry.

FIG. 3 shows an integrated circuit 300 in the form of a system-on-chip integrated circuit including a processor core 312, a digital signal processor 314, a memory 316 and a software controlled trace data slave 318, all connected via a main bus 302, such as an AMBA bus as designed by ARM Limited, Cambridge, England. Associated with each of the data processing elements 312, 314, and bus slaves 316, 318 is a trace data generator 322, 324, 326, 328 which is responsive to events and conditions occurring within the data processing element which they are monitoring to generate a trace data stream. The type of events being monitored will be familiar to those in the trace field, such as the instructions being executed, the data values being manipulated, data values being read or written to particular memory locations or the writing of a data value to a predetermined memory location serving as a trace output (e.g. the action of the software controlled trace data slave is such that a data value written to a location within a predetermined address range is output as trace data so as to allow software being executed to be instrumented to output diagnostic data in the form of trace information).

The trace data streams that have been generated are output on a respective trace bus 340, 350 to a respective trace data stream combiner 342, 352. Each of the trace data sources 312, 314, 316, 318 is provided with a trace data bus and the associated trace data stream combiner 342, 352 acts as a multiplexer. The output of the trace data stream combiner 342, 352 is also in the form of a trace bus having the same signals.

As will be seen in FIG. 3, the trace data streams may be hierarchically combined, i.e. the first trace data stream combiner 342 combines the trace data streams from the trace sources 322, 324, 326 and the second trace data stream combiner 352 combines the trace data stream output from the first trace data stream combiner 342 with that output from the software controlled trace data generator 328.

A trace data stream replicator 360 serves to replicate the trace data stream output from the trace data combiner 352 into two initially identical trace data streams that are fed through different channels. The first of these trace data streams serves as a low-bandwidth output which is passed through a formatter 362 and a trace port interface unit 372 before being output off-chip in real time. A second of the trace data streams output from the trace data stream replicator 360 is output through a formatter 364 and then stored within an on-chip embedded trace buffer memory 374. Since this data is kept on-chip, it may be a high-bandwidth signal capturing a higher level of detail.

The trace data formatter 362 is only capable of accepting trace data in byte-sized data elements, since it forms 128-bit trace data frames (see FIG. 4) formed from 16 byte-sized data elements into which trace data is packed byte-wise. In other words, the formatting protocol (equivalent to the wrapper protocol of FIG. 1) used by the formatter 362 to multiplex individual trace streams from the four trace data sources 312, 314, 316, 318 into a single trace data stream is such that it represents trace from each individual trace stream as a sequence of bytes. Since the formatting protocol is not capable of indicating the absence of one or more bits of data, the formatter 362 should be supplied with byte-sized data elements only. Thus packing circuitry 330 is required if the source trace protocol associated with a respective source 312, 314, 316, 318 has a packet granularity that is not a multiple of 8-bits (as is the case for trace source 324). Although the trace sources 322, 326, 328 have source protocols having byte-sized source data elements, the trace source 324 differs since it has a source trace protocol such that the source data elements are 6 bits rather than 8 bits in length. Accordingly, the packing circuitry module 330 is provided between the trace source 324 and the trace bus 340 to pack the 6-bit source data elements into data chunks comprising 8-bit acceptance data elements suitable for processing by the first formatter 362. Thus the packing circuitry 330 of this embodiment packs non byte-sized data elements of a source trace protocol into byte-sized acceptance data elements of a packing trace protocol.

In the embodiment of FIG. 3, the packing circuitry 330 is provided between the trace data source 324 and the associated trace bus 340. However, in alternative arrangements, the packing circuitry 330 is provided between one or more of the other trace data sources 322, 326, 328 and their respective trace buses 340, 350. In further alternative arrangements, the packing circuitry is provided as an integral part of one or more of the trace data sources 322, 324, 326, 328. In yet further alternative arrangements, the packing circuitry is provided between the trace bus 350 and the replicator 360 or indeed between the replicator 352 and one or both formatters 362, 364. Further details of the arrangement of FIG. 3 are provided in U.S. patent application Ser. No. 10/715,394 filed on 19 Nov. 2003, which is incorporated herein by reference.

The trace data sources 312, 314, 316, 318 are each arranged such that they output a trace data source ID onto the respective trace bus 340, 350 when the corresponding trace data source is outputting valid trace data. The trace data source ID is a 7-bit signal generated by the trace data source itself and output onto the trace bus 340, 350 to the trace data receiver. In FIG. 3, the trace data receiver may be any one of the trace data stream combiners 342, 352, the replicator 360, the trace port interface unit 372 or the embedded trace buffer 374.

In the embodiment of FIG. 3, the trace data formatters 362, 264 are arranged to detect which of the individual trace data sources 322, 324, 326, 328 is selected by a trace data selector (not shown) and to insert a trace source identifier in the output trace data stream in response to a change of trace data source selected by the trace data selector.

Figure 4:
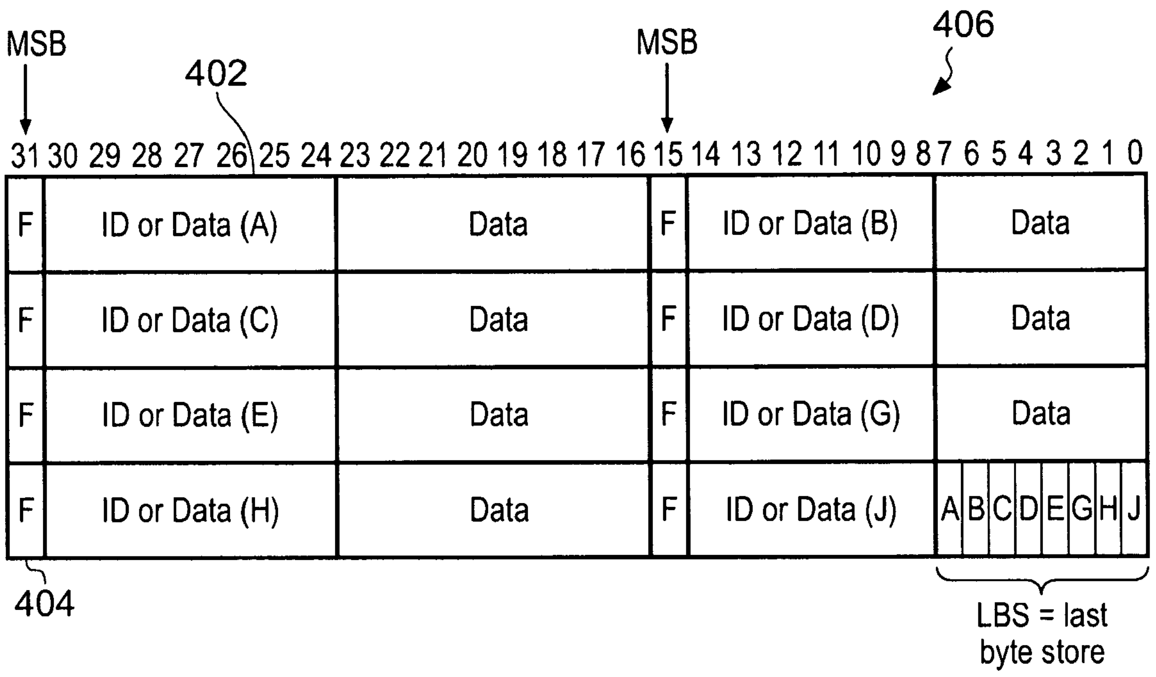
FIG. 4 schematically illustrates an output trace data frame generated by the trace data formatter of FIG. 3.

FIG. 4 schematically illustrates an output trace data frame 400 as generated by the trace data formatter 362 of FIG. 3. More particularly, this frame of output trace data comprises 128 bits of data arranged as 16 bytes. Starting with the first byte 402, alternate bytes within the trace data frame 400 may either contain a trace data source identifier ID to associate given trace data to one of the four trace data sources 322, 324, 326, 328 or trace data per se. A flag 404 associated with each of these alternate bytes indicates whether a trace data source identifier ID or trace data is stored within that byte. The last byte within the data frame 402 is a last byte store LBS and serves to store one bit related to each of the bytes (i.e. alternate bytes) which may either be a trace data source identifier ID or trace data. If the respective byte is a trace data source identifier ID, then the corresponding bit within the last byte store LBS indicates whether the trace data associated with that trace data source identifier ID starts with the first following byte of trace data or with the second following byte of trace data. If the byte is a trace data byte rather than a trace data source identifier ID as indicated by the flag 404, then the most significant bit of that byte of trace data which has been displaced by the flag 404 is stored within a corresponding bit within the last byte store LBS. It will be appreciated that trace data source identifiers ID in the present example are 7-bit values and accordingly the eighth bit is available to serve as the flag 404 and the corresponding bit within the last byte store LBS can specify the relative position of the start of the corresponding trace data. Conversely, the trace data bytes themselves are 8-bit values and the most significant bit MSB of these trace data byte values is displaced 404 and resides within the corresponding bit within the last byte store LBS.

The trace data frame 400 of FIG. 4 shows that a trace data source identifier ID can be inserted whenever a change occurs in the trace data source. If a change does not occur, then no trace data source identifier ID need be inserted and the receiver of the trace data frame 400 assumes that the trace data source is as last specified. Preferred embodiments may serve to periodically insert a trace data source identifier ID even if no change has occurred as a way of allowing a stream of output trace data to be picked up at an arbitrary point and decoded on the basis that within a bounded time a trace data source identifier ID will be found enabling further trace data to be attributed to an appropriate trace data source.

In the output trace data frame 400 of FIG. 4, a flag 404 may be used to indicate whether or not a data sequence is standard trace data or a trace data source identifier. However, in an alternative arrangement the trace data source identifier inserted in the output trace data stream by the formatter 362, 364 of FIG. 3 may be distinguishable from the standard trace data in view of the fact that a reserved sequence known as an "escape sequence" is used as an identifier. The escape sequence is reserved in the sense that it is set aside exclusively for use as a trace source identifier so it should never occur as part of a standard trace data sequence directly associated with a trace data source on output by the formatter.

A single reserved sequence may be used for the plurality of trace data sources 312, 314, 316, 318 in which case a further source-specific ID is appended to the reserved sequence to form a complete trace source identifier. The formatter 362, 364 detects any occurrence of the reserved sequence in the standard trace data streams output by the trace data sources 312, 314, 316, 318. If a reserved sequence is by chance produced then the formatter 362, 364 modifies the standard trace data output by appending additional information to the detected sequence so that it no longer corresponds to a sequence reserved as a source identifier. This enables trace analysis tools to identify the sequence in question as standard trace data rather than erroneously associating it with a change in the selected trace data source. Thus the occurrence of a reserved sequence and further source-specific ID in the output of the formatter reliably signals a change in the trace data source.

Figure 5:
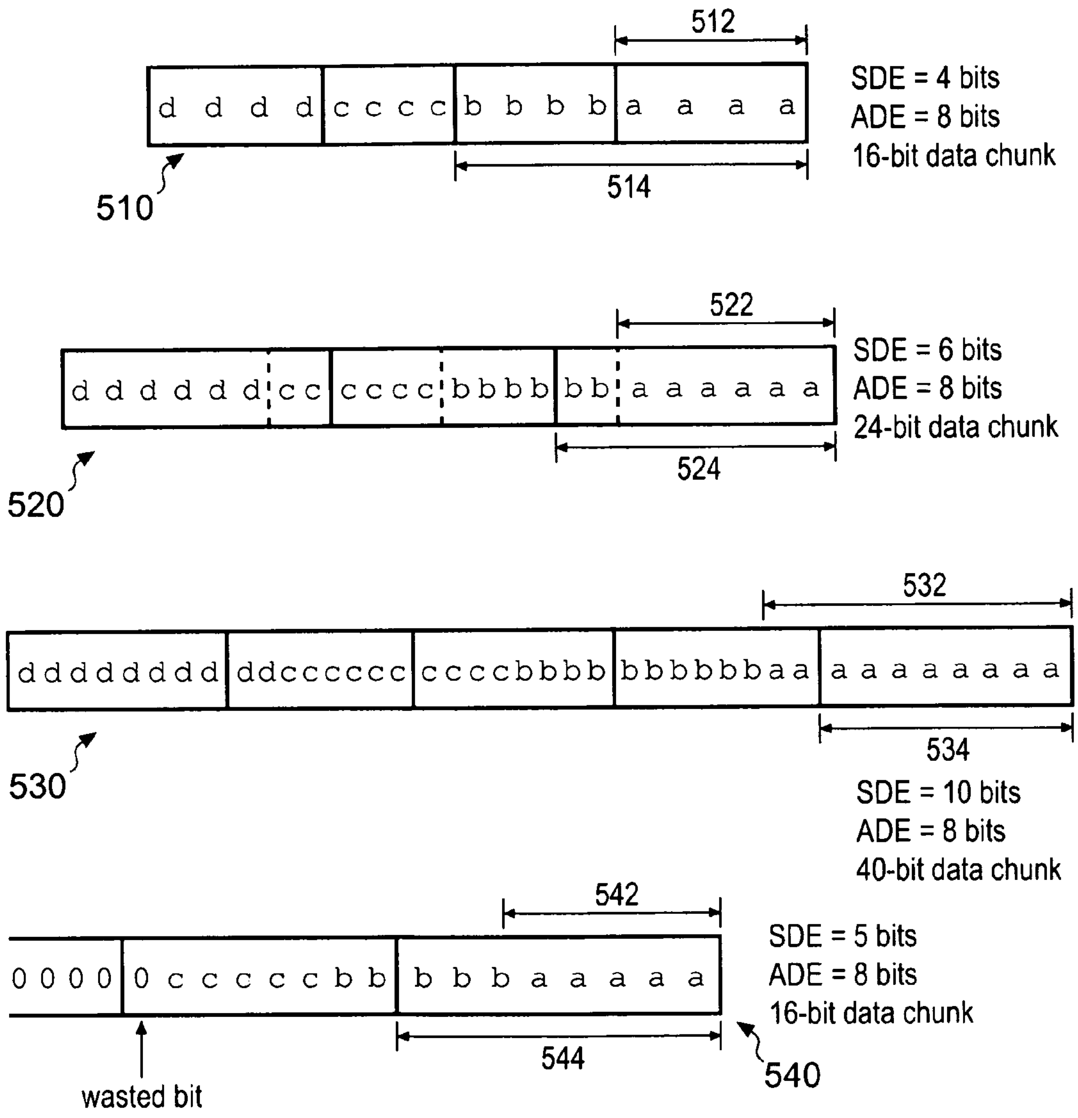
FIG. 5 schematically illustrates a packing protocol according to which contiguous packing is performed.

FIG. 5 schematically illustrates a packing protocol according to which contiguous packing is performed to pack non byte-sized source data elements into data chunks comprising one or more 8-bit acceptance data elements. In other words, the packing trace protocol has a packet granularity that is a positive integer multiple of 8-bits. Contiguous packing may also be applied to packing protocols whose packet granularity is not a multiple of 8-bits, but which support output of null packets i.e. packets that may be ignored in the trace stream (sometimes also referred to as ignore-packets).

FIG. 5 schematically illustrates four different data chunks 510, 520, 530, 540 according to a contiguous packing trace protocol. According to the contiguous packing trace protocol, acceptance data elements and data chunks are formed by packing data of source data elements associated with the source trace protocol end to end in the data chunks. Data chunk 510 is formed from four source data elements each of which comprises four bits of data. The first source data element 512 is indicated and forms part of the acceptance data element 514 which has a bit-length of 8-bits. In the data chunk 510, four 4-bit source data elements are contiguously packed to form a 16-bit data chunk. The 16-bit data chunk can alternatively be viewed as being formed from two individual 8-bit acceptance data elements.

The second data chunk 520 is formed by packing four individual source data elements each having a bit-length of 6-bits into a 24-bit data chunk comprising three 8-bit acceptance data elements. The first source data element 522 forms part of the first of the three acceptance data elements 524.

The third data chunk 530 is formed by contiguously packing four 10-bit source data elements of the source trace protocol contiguously into a 45-bit data chunk comprising five 8-bit acceptance data elements. The first 8 bits of a first source data element 532 are shown to form a first acceptance data element 534. In each of the first, second and third data chunks 510, 520 and 530 of the contiguous packing trace protocol, data of source data elements has been packed into a data chunk such that the number of bits of the source data element exactly matches the capacity of the corresponding data chunk into which the plurality of source data elements is to be packed. However, in the fourth data chunk 540, which is a 16-bit data chunk, there is not an exact fit of the three source data elements into the 16-bit data chunk. Instead two 5-bit source data elements 542 are contiguously packed into the 16-bit data chunk. This means that there is one wasted bit of the data chunk 540, which is not used to transmit data from the source trace protocol. In this case a padding bit of zero has been inserted into the data chunk to accommodate this.

Thus, according to the contiguous packing protocol, each source data element or packet-atom is packed end into data chunks. For example, two 4-bit packet atoms are packed into a chunk of one byte, or four 6-bit packet atoms are packed into a chunk of three bytes, or four 10-bit packet atoms are packed into a chunk of five bytes. The case of a protocol with a packet granularity of 8n bits is essentially contiguous packing with one packet packed into a chunk of n bytes. The case of the protocol with a packet granularity of eight is essentially as special case of direct packing, with one 8-bit packet in each byte.

As shown in the fourth data chunk 540 of FIG. 5, if one or more packets should be output, but there are insufficient packets to make it up to a whole number of bytes, then sufficient null-packets should be inserted. Depending on the packet granularity, the size of the null-packets and remaining space in the last byte, these null-packets may or may not result in additional bytes being output, which might reduce the protocol efficiency overall if this is required frequently.

As a variation on the contiguous packing protocol, the number of packets in a data chunk can be reduced below a particular (e.g. optimal) number to reduce the overhead of null-packets. For example, a protocol with a packet granularity of fifteen could pack two 15-bit source data elements into a four byte data chunk wasting two bits instead of trying to packet eight 15-bit source data elements into a data chunk of fifteen bytes.

It will be appreciated that in FIG. 1, the acceptance data elements of the data chunks 132 and 134 are packed into 128 bit frames (see FIG. 4) of the wrapper protocol by the trace accepting circuitry 140, but the protocol decoder 152 of the trace data analyser 150 is configured to be able to determine the packing alignment i.e. which acceptance data element or source data element is the first data element of the data chunk. At this point the start of an acceptance data element (e.g. a byte-sized acceptance data element) is aligned with the start of a packet atom (i.e. source data element) so that the decoder is capable of extracting a stream of source data elements from the stream of byte-sized acceptance data elements.

The protocol decoder 152 of FIG. 1 also needs to determine the protocol alignment i.e. which source data element is the first source data element of a packet of the source trace protocol. Given the start of one packet of the source trace protocol, the protocol decoder 152 is able to use information with regard to the source data protocol to determine the packet boundaries amongst the subsequent source data elements.

In some cases it may be possible for the protocol decoder 152 to deduce the source trace protocol alignment directly from the packet trace protocol alignment e.g. where the source trace protocol packets are a fixed size and aligned with the packing data chunks. It may also be possible to deduce the protocol alignment from information contained within a stream of source data elements, for example, using an alignment synchronisation sequence or by changing packet source IDs at boundaries of source trace protocol packets.

It is possible to ascertain the packing alignment by changing the trace source ID only at byte boundaries that are also data chunk boundaries. Protocol alignment might be indicated by changing the source protocol packet ID at source data element boundaries that are also packet boundaries. In some embodiments there will be payload information associated with the changed packet IDs but in other embodiments there will be no such payload information. The data processing apparatus of FIG. 3, which operates according to a "CoreSite Formatting Protocol", only indicates a change of trace source ID when at least one 8-bit data element of payload information is transmitted for that source ID.

In embodiments in which the source protocol packet granularity is a multiple of eight other than eight itself, it is possible that the protocol decoder 152 may have difficulty in identifying the beginning of a source protocol packet. However, most trace protocols are designed such that this will not be the case, but if it is, it can be solved using an additional trace ID interleaved with the main trace for the trace source to provide an alignment wrapper.

Packet alignment and protocol alignment may be performed using particular bit pattern encodings within a given trace protocol that have been designed as unused or reserved encodings. The packet and protocol alignment may be performed using in dependence upon individual ones of these sequences or sequences of the unused sequences.

In other embodiments degenerate encodings of given trace protocol may be used to perform one or both of packet-alignment and protocol alignment. In particular, some trace protocols have more than one bit pattern having the same underlying meaning within the protocol. An example is where numbers are represented with both a sign and a magnitude so that there are two bit patterns that represent positive zero and negative zero. In some protocols no other special meaning is assigned to differentiate between positive zero an negative zero bit patterns so that these bit patterns are effectively degenerate encodings. In this case a deliberate choice of one or the other of the degenerate encodings of sequence of such choices can be used to facilitate determination of one or both of the patent alignment and protocol alignment.

Figure 6:
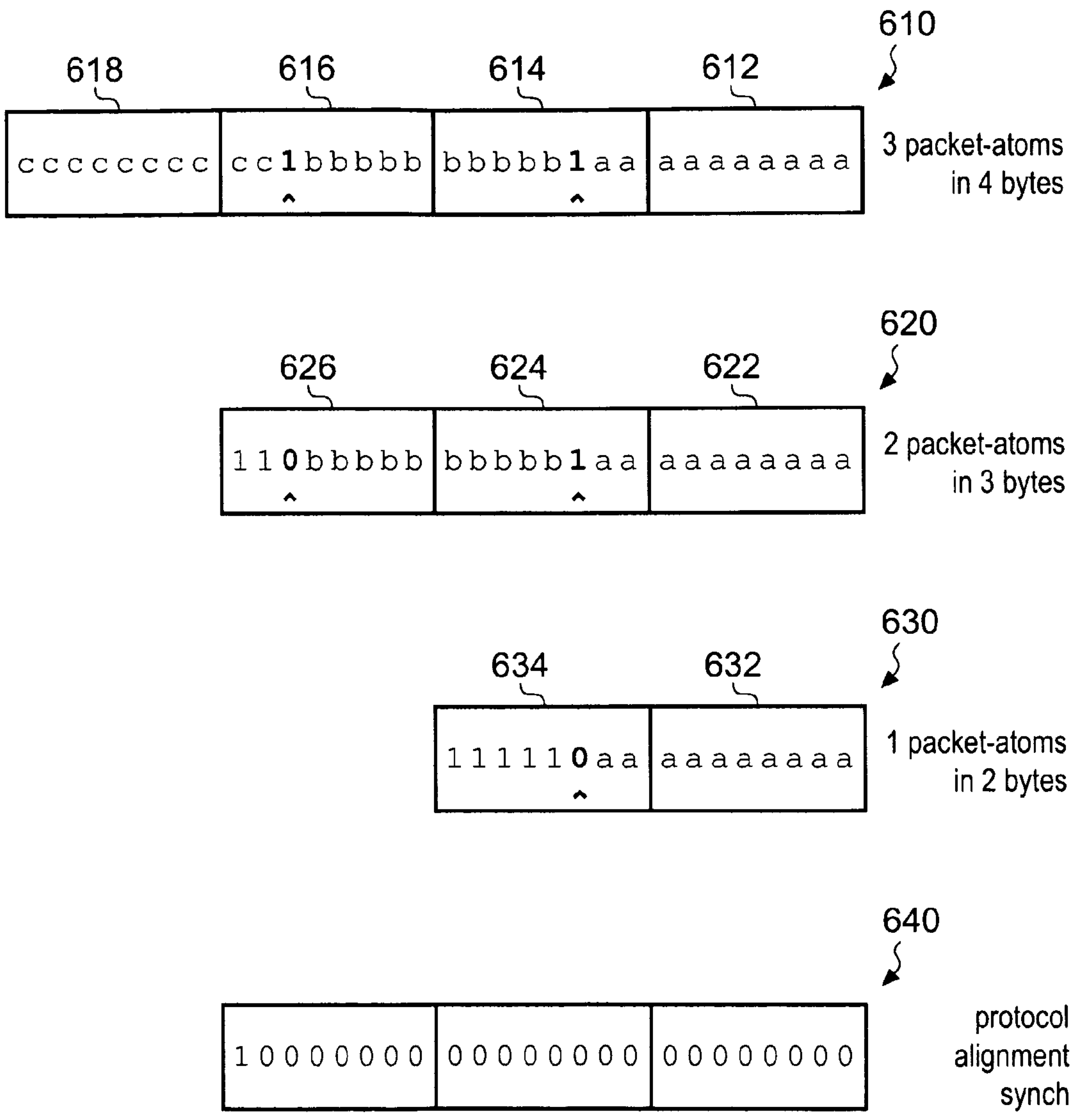
FIG. 6 schematically illustrates a packing trace protocol known as “per-packet packing”

FIG. 6 schematically illustrates a packing trace protocol known as "per-packet packing", which does not require that the trace protocol includes a null-packet. In the particular example of FIG. 6, the packet granularity of the source trace protocol is ten i.e. the source data elements have a bit-length of ten bits. Three different data chunks output by the packing circuitry 130 of FIG. 1 are shown in FIG. 6.

A first data chunk 610 comprises three 10-bit source data elements packed into a four-byte data chunk comprising byte-size acceptance data elements. Thus the first acceptance data element 612 comprises eight bits of data from the first source data element. A second acceptable data element 614 comprises two bits of data from the first source data element and five bits of data from a second source data element and, in addition, comprises a continuation bit "1" marking the boundary between data of the first source data element and the second source data element. Similarly the third acceptance data element 616 comprises five bits of data from the second source data element, two bits of data from the third source data element and a continuation bit separating data from the two source data elements. The final acceptance data element 618 contains the remaining eight bits of the third 10-bit source data element.

A second data chunk 620 comprises a three-byte data chunk into which two 10-bit source data elements have been packed. In this case, a first acceptance data element 622 comprises eight bits of data from a first source data element, a second acceptance data element 624 comprises two bits of a first source data element and five bits from a second source data element in addition to a continuation bit separating data from the two source data elements. A third acceptance data element 626 comprises the remaining five bits of data from the second source data element followed by a "zero" bit to indicate that there are no further source data bits to be output and that the following data bits should be ignored. Thus the last three bits of the acceptance data element 626 are ignored downstream by the protocol decoder 152 of the trace data analyser 150 of FIG. 1.

The third data chunk 630 of FIG. 6 comprises two bytes and contains data corresponding to a single source data element. Thus the first acceptance data element 632 comprises eight bits of source protocol data, whilst the second acceptance data element 634 comprises the remaining two bits of source data followed by a "zero" bit and five padding bits, which will be ignored downstream by the protocol decoder.

FIG. 6 also shows a protocol alignment synchronisation pattern 640 comprising a continuous sequence of twenty-three zeros. In the example of FIG. 6, since the trailing bits that follow the zero bit in data chunks 620 and 630 (which indicates that there is no further source data element in this set of bytes) are all set to one. This sets an upper limit on the number of consecutive 0-bits in a sequence of acceptance data elements and thus facilitates using the bit pattern 640 as a protocol alignment synchronisation sequence. Thus in the example of FIG. 6, each packet atom (or source data element) in a data chunk other than the last acceptance data element is followed by a continuation-bit indicating whether another source data element follows in the same data chunk. If the continuation bit is zero then no further bytes are output and any following bits in the same byte are ignored. For example, if the packet granularity is ten, packets can be packed as shown in FIG. 6. Note that in FIG. 6 the first output bit is on the right of the diagram.

In the example of FIG. 6, the bits indicating the existence of a follow-up source data element are transmitted after the 10-bit source data element but in alternative arrangements they could be transmitted in other bit positions, for example before the given source data element.

In alternative "per-packet" packing protocols to that illustrated in FIG. 6, if the protocol includes ignore packets, then a single continuation-bit can be used to correspond to more than one source protocol packet. This reduces the overhead, particularly in the case of small source packets.

Figure 7A:
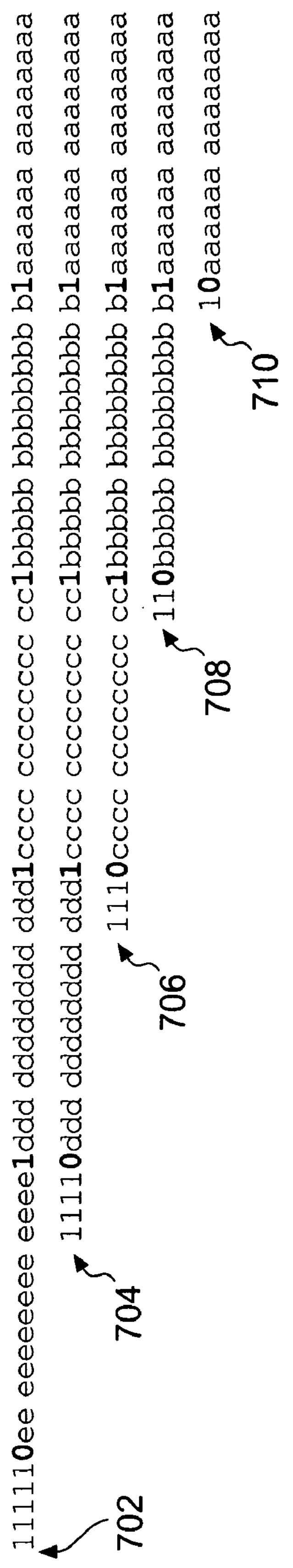
FIGS. 7A and 7B schematically illustrate an alternative embodiments of the per-packet packing protocol of FIG. 6.
Figure 7B:
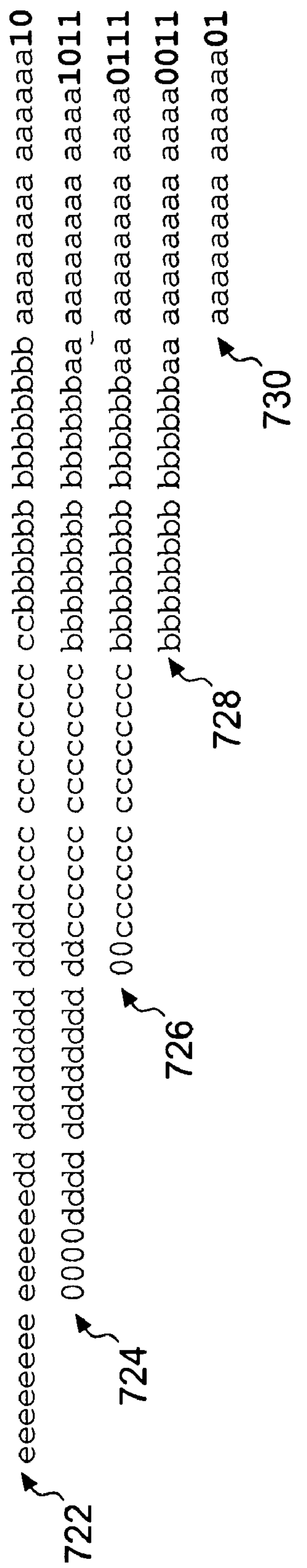

FIGS. 7A and 7B schematically illustrate an alternative embodiment to the per-packet to packing protocol of FIG. 6. In this alternative per-packet packing protocol, variable length indicator bit patterns are used such that encodings are chosen to pack certain quantities of data bits into a smaller quantity of bytes.

FIG. 7A schematically illustrates a standard per-packet to packing protocol, similar to that illustrated in FIG. 6. For example, with 14-bit source data elements, the standard per-packet to packing protocol requires 2*n bytes in order to pack n 14-bit source data elements. In the particular example shown in order to pack five floating 14-bit source data elements ten 8-bit acceptance data elements are required.

In FIG. 7A, a first data chunk 702 is used to pack five 14-bit source data elements into ten byte-sized acceptance data elements of the data chunk. A second data chunk 704 comprises eight byte-sized acceptance data elements into which are packed four 14-bit source data elements (i.e. packed atoms). A third data chunk 706 comprises six byte-sized acceptance data elements into which three 14-bit source data elements are packed. A fourth data chunk 708 comprises a four byte data chunk, which is used to pack two 14-bit source data elements and a fifth data chunk 710 uses two bytes to pack a single 14-bit source data element. It can be seen that the first data chunk 701 requires five packing bits following the "zero" end indicator bit, a second data chunk 704 requires four packing bits following the end zero bit, the third data chunk 706 requires three packing bits, the fourth data chunk 708 requires two packing bits and the fifth data chunk 710 requires a single packing bit.

FIG. 7B shows a per-packing to packing protocol that provides more efficient packing then the protocol of FIG. 7A by using variable length indicator bit patterns to encode the data. In FIG. 7B a first data chunk 722 packs five 14-bit source data elements into nine data acceptance bytes. A second data chunk 724 packs four source data elements into eight byte-sized acceptance data elements. A third data chunk 726 packs three source data elements into six byte-sized acceptance data elements. A fourth data chunk 728 packs two 14-bit source data elements into four byte-sized acceptance data elements whilst a fifth data chunk 730 packs a single 14-bit source data element into two byte-sized acceptance data elements. Note that the first and fifth data chunks 722 and 730 comprise a 2-bit encoding whereas the second, third and fourth data chunks 724, 726 and 728 comprise 4-bit encodings. The particular arrangement and length of these variable-length encodings is selected to allow more efficient packing to be performed. Note that the longer 4-bit indicator sequences are not necessarily used for the longest data chunks, in fact the longest data chunk 722 has one of the shorter two-bit encodings. It can be seen from a comparison of FIG. 7A and FIG. 7B that packing of one, two, three, and four source data elements into a respective data chunk results in the same size of data chunk for the two different per-packing trace protocols. However, in the case of the packing of five source data elements into a data chunk, the data chunk 722 requires only nine bytes whereas the data chunk 702 requires ten bytes in the data chunk, thus use of variable-length encodings can be seen to improve packing efficiently.

Thus by changing the mapping of data lengths of source data onto the patterns of indicator bits of the variable length encodings, a more efficient coding scheme as shown in FIG. 7B is produced, which packs five source data elements (packet-atoms) into only nine bytes, saving ten percent over the 2:1 ratio of the protocol of FIG. 7A. The scheme of FIG. 7A does have some improved efficiency at n=7 (i.e. packing seven source data elements into thirteen bytes), but this is only a seven percent saving over the 2:1 ratio.

FIGS. 8A, 8B, 8C, and 8D schematically illustrate different implementations of a so-called “bit-field” packing protocol. Such bit-field packing is appropriate for protocols having a packet granularity of one i.e. for completely variable-length packets. The bit-field packing does not require the support of a null packet.

FIG. 8A schematically illustrates bit-field packing for an n=1 case in which each byte of the packing trace protocol can encode up to seven bits of data from the source data elements. In FIG. 8A data from source data elements is represented by the letter “d”, and each byte comprises a size-indicating code comprising a given sequence of zeros and ones. As shown in FIG. 8A a size-indicating code of one is used to encode an 8-bit acceptance data element comprising seven bits of source data element data; a size-indicating code “01” is used to indicate an 8-bit acceptance data element comprising six bits of data from source data elements; a size-indicating code “001” is used to indicate an 8-bit acceptance data element comprising five bits of data from source data elements and so on. There are two reserved encodings 810, 812 comprising 8-bit encodings having no source data elements contained therein.

FIG. 8B shows how the case of FIG. 8A can be extended from an n=1 scheme to encode up to (8n−1) bits in n bytes. Choosing larger values of n reduces the overhead. In particular, FIG. 8B corresponds to the n=2 case where data chunks comprise two 8-bit acceptance data elements and each 16-bit data chunk comprises a portion including data taken from the source data elements and a portion comprising a size-indicating code indicating how many bits of the source data elements are contained within the corresponding data chunk. Again, two reserved codes are provided 822, 824.

FIG. 8C schematically illustrates a bit-field packing protocol that uses a separate encoding for a large quantity of data. In particular, it can be seen that in the example of FIG. 8C, similarly to the case of FIG. 8A, individual 8-bit acceptance data elements are used to encode one, two, three, fourth, five and six bits of data: with size-indicating codes of length seven bits when conveying one bit of source protocol data; six bits when conveying two bits of source protocol data; five bits when conveying three bits of source protocol data; four bits when conveying four bits of source protocol data; three bits when conveying five bits of source protocol data; and two bits when conveying six bits of source protocol data. However, a single-bit size-indicating code is used to indicate an associated sequence of 8n+7 bits of source element data where n is defined in advance. In this case quantities of data between 7 and 8n+6 bits are transmitted as two or more of the shorter encodings.

The method of FIG. 8C, which uses a separate encoding for a larger quantity of data, can be further generalised. In particular, there are 256 (=$2^8$) encodings available, which can be sub-divided to express: (i) a number of bits of data and (ii) a number of bits of data plus an indication of the number of bits of data to follow in future bytes. The distribution of encodings can vary according to the properties of the protocol being encoded.

FIG. 8D schematically illustrates an example of a bit-field packing protocol in which data chunks are comprised of 1, 2 or n+1 bytes, where n is defined in advance. The size-indicating code is transmitted prior to the source element data. The encodings are largely identical to the example of FIG. 8C except for the data chunk 832, which uses the size-indicating code “10” to indicate the inclusion of 14-bits of source protocol data. This can be compared and contrasted with the protocol of FIG. 8C where the size indicating code “10” is used to indicate transmission of six bits of data within a byte-sized acceptance data element.

In the case of the bit-field packing trace protocol illustrated by FIGS. 8A to D, it will be appreciated that both the sense of the bits (zero or one) and the position of the size-indicating code bits within the bytes of the data chunk (most significant bit to least significant bit) correspond to one example embodiment. Alternative example embodiments are also possible in which different permutations are used. For example, in one alternative embodiment a permutation of bit position significance within the byte is chosen and/or the sense of some bits of the size-indicating code is inverted in order to achieve better average frequency characteristics when the bytes of the data chunk are serially transmitted. Where such permutations or inversions are used, this could potentially impact the choice of synchronisation patterns, which sometimes rely on long runs of values known not to occur during normal data.

As indicated above in relation to the contiguous packing embodiments, one or both of packet-alignment or protocol alignment can be performed in dependence upon degenerate encodings of a given trace protocol.

In so far as embodiments of the invention described above are implemented, at least in part, using software-controlled data processing apparatus, it will be appreciated that a computer program providing software control and a transmission, storage or other medium by which such a computer program is provided are envisaged as aspects of the present invention.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

Further aspects of embodiments of the invention can be understood from the following description.

Packing Trace Protocols within Trace Streams.

Trace refers to an approach used to aid tasks such as debugging and performance analysis of electronic data processing systems. Packets of data that represents some aspect of operation of the system are generated and passed on for storage or for immediate or later processing or analysis. One example of such trace data would be that generated by an Embedded Trace Macrocell, hereafter ETM, corresponding to the stream of instructions executed by a data processor.

The following description refers to apparatus and method for taking a trace stream including non-byte sized data and packing it into a stream comprising byte-sized data The invention can also be applied to other data sizes for each of source stream and output stream where zero, one or both of these sizes may be a multiple of 8 bits.

U.S. patent application Ser. Nos. 10/715,394 and 10/635,920 (now U.S. Pat. No. 7,149,933) include example descriptions of trace sub-systems within data processing systems.

One example embodiment of the invention described herein could be illustrated in a modified version of FIG. 1 of patent application Ser. No. 10/715,394. A packing unit could be situated between one of trace sources 12, 14, 16 or 18 and trace bus 20 or 24. The packing circuitry might also be incorporated at other points within such sub-systems, for example within one of trace sources 12,14,16 or 18, or between trace bus 26 and replicator 28, or between replicator 28 and one or both of formatters 30 or 34.

Application Ser. No. 10/715,394 refers to a trace formatting protocol, which is referred to below as the CoreSight Formatting Protocol.

Terminology.

The packet granularity of a protocol is defined as the highest common factor of the length in bits of every possible packet in a trace protocol. For example, in ARM's ETM architecture version3, ETMv3, the protocol packet granularity is 8, because every packet is a multiple of 8 bits long. A packet-atom refers to a number of bits of data equal to the packet granularity. The word packet is used to indicate a quantity of trace with some meaning within a given protocol and that may comprise one or more packet-atoms.

If a trace protocol is designed to be output on a dedicated trace port, then it is always possible to represent such a trace as a sequence of packets each of the same width as the trace port. In this case, the protocol packet granularity will be the number of pins of the trace port. More efficient schemes might be possible: for example, a 16-bit trace port carrying ETMv3 trace can be represented either as a sequence of 16-bit packets, or 8-bit packets, because the underlying ETMv3 protocol is known to have a protocol packet granularity of 8.

The CoreSight formatting protocol used to multiplex multiple trace streams into a single data stream represents trace from each stream as a sequence of bytes. This means that it must have 8 bits of trace to be output before any can be output; the protocol cannot indicate an absence of one or more bits. The CoreSight formatting protocol is an easy fit for trace protocols with a packet granularity which is a multiple of 8; otherwise additional thought is required.

The following sections describe the packing options, their applicability and their drawbacks.

Contiguous Packing

Applicable only to protocols with a packet granularity that is a multiple of 8, or to protocols which support a null-packet, i.e. one which may be ignored within the trace stream, sometimes also referred to as an ignore-packet.

Each packet-atom is packed end to end, into chunks. For example, 2 4-bit packet-atoms are packed into a chunk of 1 byte, or 4 6-bit packet-atoms are packed into a chunk of 3 bytes, or 4 10-bit packet-atoms are packed into a chunk of 5 bytes. The case of a protocol with a packet granularity of 8n bits is essentially contiguous packing with 1 packet packed into a chunk of n bytes. The case of a protocol with a packet granularity of 8 is essentially a special case of direct packing, with 1 8-bit packet in each byte.

If one or more packets must be output but there are insufficient packets to make it up to a whole number of bytes, then sufficient null-packets must be inserted. Depending on the packet granularity, the size of the null-packets, and the remaining space in the last byte, these null-packets may or may not result in additional bytes being output, which might reduce the protocol efficiency overall if this is required frequently.

Variation—the number of packets in a chunk can be reduced below the optimal number to reduce the overhead of null-packets. For example, a protocol with packet granularity 15 could pack 2 packets into 4 bytes, wasting 2 bits, instead of trying to pack 8 packets into 15 bytes.

Packing Alignment

The packing decoder needs to determine the packing alignment, i.e. which byte is the first of a chunk. At this point the start of a byte is aligned with the start of a packet-atom, so the decoder can extract a stream of packet-atoms from the stream of bytes.

Protocol Alignment

The protocol decoder needs to determine the protocol alignment, i.e. which packet-atom is the first of a packet. Given the start of one packet, the decoder can use knowledge of the protocol to determine the packet boundaries amongst subsequent packet-atoms.

It may be possible to deduce the protocol alignment directly from the packing alignment (e.g. where the packets are fixed size, and aligned with the packing chunks). It may be possible to deduce the protocol alignment from information contained within the stream of packet-atoms (e.g. using an alignment synch sequence, or changing packet source ids at packet boundaries).

Packing alignment might be indicated by changing packet source id only at byte boundaries that are also chunk boundaries.

Protocol alignment might be indicated by changing packet source id at packet-atom boundaries that are also packet boundaries. There may or may not be payload information associated with the changed packet ids (but the CoreSight Formatting Protocol only indicates a change of source of id when at least one byte of payload information is transmitted for that source id).

If the protocol packet granularity is a multiple of 8 other than 8 itself, it is possible that the protocol decoder might not be able to identify the beginning of a packet. Most protocols are designed such that this will not be the case, but if it is, it can be solved by using an additional trace ID interleaved with the main trace for the trace source, to provide an alignment marker. This is suggested in the CoreSight architecture specification in the ATB definition, and can be used generically as a protocol alignment synchronisation mechanism.

Encoding Synch/Alignment Information

Reserved or Unused Encodings

Some bit pattern encodings within a protocol may be designated as unused or reserved. These encodings, or a sequence of them, might be used to aid determination of one or both of packet-alignment and protocol alignment.

Use of Degenerate Encodings

In some cases a trace protocol may have more than one bit pattern that has the same underlying meaning within the protocol. An example is where numbers are represented with sign and magnitude so that there are two bit patterns which represent positive zero and negative zero, and the protocol has assigned no other special meaning to differentiate between these bit patterns. In this case a deliberate choice of one or other encoding, or sequence of such choices, might be used to aid determination of one or both of packet-alignment and protocol alignment.

Per-Packet Packing

Does not require that the protocol includes a null-packet.

Each packet-atom in a chunk, other than the last, is followed by a continuation-bit indicating whether another packet-atom follows in the same chunk. If the bit is '0' then no further bytes are output and any following bits in the same bytes are ignored. For example, if the packet granularity is 10, packets can be packed as follows (first output bit on the right):

```
cccccccc  cc1bbbbb  bbbbb1aa  aaaaaaaa3 packet-atoms in 4 bytes
            A              A
           110bbbbb   bbbbb1aa  aaaaaaaa  2 packet-atoms in 3 bytes
            A              A
                    111110aa  aaaaaaaa    1 packet-atom in 2 bytes
                         A
          10000000  00000000  00000000    protocol alignment synch.
```

In this example, the bits indicating the existence of a follow-up packet-atom are transmitted after the 10-bit packet-atom, but they could be transmitted in other bit positions, for example before that packet-atom.

In this example, the trailing bits, that follow the zero-bit that indicates that there is no further packet-atom in this set of bytes, are all set to 1. This sets an upper limit on the number of consecutive zero-bits in a sequence of packets, and so facilitates using the bit pattern shown for protocol alignment synch.

Variation—if the protocol includes ignore packets, then a single continuation-bit may correspond to more than one packet. This reduces the overhead, particularly in the case of small packets.

A variation of this method has_variable length_indicator bit patterns where the encodings are chosen to pack certain quantities of data bits into a smaller quantity of bytes.

For example, with 14-bit packet-atoms, the encoding shown above would require 2n bytes for n14-bit packet atoms, and particularly 10 bytes to pack 5 packet-atoms. By changing the mapping of data length onto the patterns of indicator bits, a more efficient encoding scheme is shown, which packs 5 packet-atoms into only 9 bytes, saving 10% over the 2:1 ratio. (The original scheme has some improved efficiency at n–,=7, packing 7 packet-atoms into 13 bytes, but this is only a 7% saving over the 2:1 ratio).

One continuation-bit per packet-atom:

| |
|---|
| 111110ee eeeeeeee eeeelddd dddddddd dddlcccc cccccccc cclbbbbb bbbbbbbb b1aaaaaa aaaaaaaa |
| 11110ddd dddddddd ddd1cccc cccccccc cclbbbbb bbbbbbbb blaaaaaa aaaaaaaa |
| 11100ccc cccccccc cc1bbbbb bbbbbbbb b1aaaaaa aaaaaaaa |
| 110bbbbb bbbbbbbb b1aaaaaa aaaaaaaa |
| 10aaaaaa aaaaaaaa |

Variable length indicator bit patterns:

| |
|---|
| eeeeeeee eeeeeedd dddddddd ddddcccc cccccccc ccbbbbbb bbbbbbbb aaaaaaaa aaaaaal0 |
| 0000dddd dddddddd ddcccccc cccccccc bbbbbbbb bbbbbbaa aaaaaaaa aaaa1011 |
| 00ecoccb cccccccc bbbbbbbb bbbbbbaa aaaaaaaa aaaa0111 |
| bbbbbbbb bbbbbbaa aaaaaaaa aaaa0011 |
| aaaaaaaa aaaaaa0l |

Bit-Field Packing

Appropriate for protocols with packet granularity of 1, i.e. completely variable length packets. Does not require support of a null-packet.

Each byte can encode up to 7 bits, encoded as follows:

| | |
|---|---|
| 1ddddddd | 7 bits of data |
| O1dddddd | 6 bits of data |
| 001ddddd | 5 bits of data |
| 0001dddd | 4 bits of data |
| 00001ddd | 3 bits of data |
| 000001dd | 2 bits of data |
| 0000001d | 1 bit of data |
| 00000001 | reserved |
| 00000000 | reserved |

This illustration shows the n=1 case of a scheme can be extended to encode up to (8n−1) bits in n bytes, where choosing larger values of n reduces the overhead. So for n=2 the encodings could be:

| | |
|---|---|
| 1ddddddd dddddddd | 15 bits of data |
| O1dddddd dddddddd | 14 bits of data |
| 00000000 0000001d | 1 bit of data |
| 00000000 00000001 | reserved |
| 00000000 00000000 | reserved |

A further refinement of this scheme uses a separate encoding for a large quantity of data, to improve the best case efficiency. For example:

| | |
|---|---|
| fdddddddddl'n ddddddd1 | 8n + 7 bits of data (where n defined in advance) |
| dddddd10 | 6 bits of data |
| ddddd100 | 5 bits of data |
| dddd1000 | 4 bits of data |
| ddd10000 | 3 bits of data |
| dd100000 | 2 bits of data |
| d1000000 | 1 bit of data |
| 10000000 | reserved |
| 00000000 | reserved |

where quantities of data between 7 and 8n+6 bits can be transmitted as two or more of the shorter encodings.

Clearly this method can be further generalised. There are 256 encodings available, which can be subdivided to express:

a number of bits of data a number of bits of data, plus an indication of the number of bits of data to follow in future bytes.

The distribution of encodings will vary according to the properties of the protocol being encoded.

As an illustration, the following encoding illustrates a scheme where chunks are made up of 1, 2 or n+1 bytes:

| | | |
|---|---|---|
| {dddddddd}"n | ddddddd1 | 8n + 7 bits of data (where n defined in advance) |
| Ddddddd | dddddddl0 | 14 bits of data |
| | ddddd100 | 5 bits of data |
| | dddd1000 | 4 bits of data |
| | ddd10000 | 3 bits of data |
| | dd100000 | 2 bits of data |
| | d1000000 | 1 bit of data |
| | 10000000 | reserved |
| | 00000000 | reserved |

Significance of Indicator Bit Positions

Note that in the example encodings presented, both the sense of bits (0 or 1) and the position of the indicator bits within the bytes (msb to lsb) are merely illustrative, and alternative permutations are possible. For example, for a particular implementation it may be advantageous to choose a permutation of bit position significance within a byte, or to invert the sense of some bits, in order to achieve better average frequency characteristic when the bytes are transmitted serially. Where such permutations or inversions are used, this might impact the choice of synchronisation patterns that sometimes rely on long runs of values known not to occur during normal data.

Use of Degenerate Encodings

In some eases a trace protocol may have more than one bit pattern that has the same underlying meaning within the protocol. An example is where numbers are represented with sign and magnitude so that there are two bit patterns which represent positive zero and negative zero, and the protocol has assigned no other special meaning to differentiate between these bit patterns. In this case a deliberate choice of one or other encoding, or sequence of such choices, might be used to aid determination of one or both of packet-alignment and protocol alignment.

We claim:

1. Apparatus for processing data comprising a trace data receiver for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing circuitry is arranged to pack a first positive integer number of said source data elements into a respective data chunk comprising a second positive integer number of said acceptance data elements, said packing being such that said second positive integer number is different from said first positive integer number and wherein said packing circuitry is arranged to perform said packing such that said source data elements are recoverable from said packed trace data stream by trace data analysing circuitry.

2. Apparatus according to claim 1, wherein said first positive integer number is one and said second positive integer number is a positive integer greater than one.

3. Apparatus according to claim 1, wherein said first positive integer number is a positive integer greater than one and said second positive integer number is one.

4. Apparatus according to claim 1, wherein said packing circuitry is arranged to contiguously pack a plurality of source data elements into said respective data chunk.

5. Apparatus as claimed in claim 1, wherein said packing circuitry is arranged to form said packed data stream such that a boundary of said data chunk is permitted to be non-coincident with a packet boundary between adjacent ones of said plurality of packets of said source trace data stream.

6. Apparatus as claimed in claim 1, wherein said packing circuitry is arranged to vary said second positive integer number of acceptance data elements in said data chunk in dependence upon a number of said source data elements currently available to said packing circuitry.

7. Apparatus as claimed in claim 1, wherein said packing circuitry is arranged to insert in a given data chunk at least one padding bit in addition to data of said source elements to form a data chunk having a predetermined bit-length.

8. Apparatus as claimed in claim 7, wherein said packing protocol supports null packets and wherein said at least one padding bit comprises a null packet of said packing protocol.

9. Apparatus as claimed in claim 1, wherein said packing circuitry is arranged to insert in said packed trace data stream a continuation bit between adjacent ones of said plurality of source data elements of a given data chunk.

10. Apparatus as claimed in claim 9, wherein said continuation bit is transmitted after said corresponding source data element.

11. Apparatus as claimed in claim 9, wherein said packing circuitry is arranged to insert in a given data chunk at least one padding bit in addition to data of said source elements to form a data chunk having a predetermined bit-length.

12. Apparatus as claimed in claim 11, wherein said packing circuitry is arranged to insert in said given data chunk comprising at least one padding bit, a data-end indicator indicating a boundary between data of said source data elements and said at least one padding data bit within said given data chunk.

13. Apparatus as claimed in claim 11, wherein said data-end indicator is a zero-bit and said at least one padding data bit is a one-bit.

14. Apparatus as claimed in claim 9, wherein said packing protocol supports null packets and wherein said continuation bit is corresponds to a plurality of said source data elements of a given data chunk.

15. Apparatus as claimed in claim 1, wherein said packing circuitry is arranged to generate said data chunk such that said data chunk is formed from a first portion comprising a variable-length indicator pattern and a second portion comprising said data of said source data elements.

16. Apparatus as claimed in claim 15, wherein said variable-length indicator pattern is indicative that a predetermined number of bits of said data of said source data elements is contained within a corresponding data chunk.

17. Apparatus as claimed in claim 16, wherein said data chunk comprises at least one padding bit.

18. Apparatus as claimed in claim 1, wherein said packing protocol comprises unused encodings and packing circuitry is arranged to generate said packed trace data stream such that said unused encodings are used by said trace data analysing circuitry to determine at least one of protocol alignment and packet alignment within said packed trace data stream to enable said recovery of said source data elements from said packed trace data stream.

19. Apparatus as claimed in claim 1, wherein said packing protocol comprises reserved encodings and packing circuitry is arranged to generate said packed trace data stream such that said reserved encodings are used by said trace data analysing circuitry to determine at least one of protocol alignment and packet alignment within said packed trace data stream to enable said recovery of said source data elements from said packed trace data stream.

20. Apparatus as claimed in claim 1, comprising a plurality of said trace data receivers each arranged to receive a respective plurality of source trace data streams having corresponding source trace protocols and wherein said packing circuitry is arranged to form said packed trace data stream for at least one of said plurality of source data streams.

21. Apparatus as claimed in claim 20, comprising:

a trace data selector operable to select one of said plurality of source trace data streams as a selected trace data stream for output; and a trace data formatter operable to format said selected trace data stream to form an output trace data stream;

wherein said trace data formatter is operable to detect which of said individual trace data sources is selected by said trace data selector and to insert a trace data source identifier in said output trace data stream in response to a change of trace data source selected by said trace data selector.

22. Apparatus as claimed in claim 20, wherein said packing circuitry is provided within a corresponding one of said plurality of trace data sources.

23. Apparatus as claimed in claim 20, wherein said trace accepting circuitry to which said packed data stream is supplied corresponds to said trace data formatter.

24. Apparatus for processing data comprising a trace data receiver for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said source data elements are non byte-sized data elements and wherein said packed trace data stream comprises one or more of said acceptance data elements and said packing circuitry is arranged to perform said packing such that said source data elements are recoverable from said packed trace data stream by trace data analysing circuitry.

25. Apparatus for processing data comprising a trace data receiver for receiving a source trace data stream corresponding to a source trace protocol having a variable packet size, said source trace data stream comprising a plurality of packets of trace data, each of said plurality of packets comprising at least one source data element, said source data element having a bit-length corresponding to a highest common factor of bit-lengths of all possible packets of said source trace protocol;

packing circuitry arranged to receive said source data elements from said trace data receiver and to apply a packing protocol to said source data elements to pack said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing circuitry is arranged to pack data of at least one of said source data elements into a respective data chunk having a bit-length that is not a factor of said acceptance data-element bit-length, said data chunk being formed such that a first portion of said data chunk comprises a number of bits of data of said source data elements and a further portion of said data chunk comprises a size indicating code specifying a number of bits of said source data elements contained within said data chunk and wherein said packing circuitry is arranged to perform said packing such that said source data elements are recoverable from said packed trace data stream by trace data analysing circuitry.

26. Apparatus as claimed in claim 25, wherein said data chunk comprises a positive integer number of acceptance data elements greater than one.

27. Apparatus as claimed in claim 25, wherein said data chunk bit length is 8 bits.

28. Apparatus as claimed in claim 25, wherein said data chunk comprises positive integer n bytes of data within which is encoded up to (8n-1) bits of data of said source data elements.

29. Apparatus as claimed in claim 25, wherein said packing circuitry is arranged to output a plurality of said data chunks having a plurality of predetermined bit-lengths.

30. Apparatus as claimed in claim 25, wherein said packed data stream is a serially transmitted data stream and wherein said packing circuitry is arranged to select said size indicating code portion of said data chunk in dependence upon an average frequency characteristic of said serially transmitted packed data stream.

31. Method of processing data on a data processor, said method comprising:

receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

applying a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing is performed such that a first positive integer number of said source data elements is packed into a respective data chunk comprising a second positive integer number of said acceptance data elements, said packing being such that said second positive integer number is different from said first positive integer number and wherein said packing is performed such that said source data elements are recoverable from said packed trace data stream by trace data analysing circuitry.

32. A computer program product embodied on a non-transitory computer-readable storage medium containing computer readable instructions that when executed on a computer performs the method of claim 31.

33. Method of processing data on a data processor, said method comprising:

receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

apply a packing protocol to said source data elements to pack data of said source data elements into a packed trace data stream for supply to trace accepting circuitry in a format comprising acceptance data elements, said acceptance data elements having a bit-length that is not a factor of said source data element bit-length;

wherein said source data elements are non byte-sized data elements and wherein said packed trace data stream comprises one or more of said acceptance data elements and said packing is performed such that said source data elements are recoverable from said packed trace data stream by trace data analysing circuitry.

34. A computer program product embodied on a non-transitory computer-readable storage medium containing computer readable instructions that when executed on a computer performs the method of claim 33.

35. Method of processing data on a data processor, said method comprising:

receiving a source trace data stream corresponding to a source trace protocol having a variable packet size, said source trace data stream comprising a plurality of packets of trace data, each of said plurality of packets comprising at least one source data element, said source data element having a bit-length corresponding to a highest common factor of bit-lengths of all possible packets of said source trace protocol;

receiving said source data elements from said trace data receiver and applying a packing protocol to said source data elements to pack said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein data of at least one of said source data elements is packed into a respective data chunk having a bit-length that is not a factor of said acceptance data-element bit-length, said data chunk being formed such that a first portion of said data chunk comprises a number of bits of data of said source data elements and a further portion of said data chunk comprises a size indicating code specifying a number of bits of said source data elements contained within said data chunk and wherein said packing is such that said source data elements are recoverable from said packed trace data stream by trace data analysing circuitry.

36. A computer program product embodied on a non-transitory computer-readable storage medium that when executed on a computer performs the method of claim 35.

37. Apparatus for processing data comprising means for receiving trace data for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

means for packing arranged to receive said source data elements from said means for receiving trace data and to apply a packing protocol to said source data elements to pack data of said source data elements into a packed trace data stream for supply to means for accepting trace data in a format comprising acceptance data elements, said acceptance data elements having a bit-length that is not a factor of said source data element bit-length;

wherein said packed trace data stream comprises one or more of said acceptance data elements wherein said packing circuitry is arranged to pack a first positive integer number of said source data elements into a respective data chunk comprising a second positive integer number of said acceptance data elements, said packing being such that said second positive integer number is different from said first positive integer number and wherein said means for packing is arranged to perform said packing such that said source data elements are recoverable from said packed trace data stream by means for analysing trace data.

38. Apparatus for processing data comprising means for receiving trace data for receiving a source trace data stream corresponding to a source trace protocol, said source trace data stream comprising a plurality of packets of trace data, each of said plurality of packets comprising at least one source data element, said source data element having a bit-length corresponding to a highest common factor of bit-lengths of all possible packets of said source trace protocol;

means for packing arranged to receive said source data elements from said trace data receiver and to apply a packing protocol to said source data elements to pack data of said source data elements into a packed trace data stream for supply to means for accepting trace data in a format comprising acceptance data elements, said acceptance data elements having a bit-length that is not a factor of said source data element bit-length;

wherein said source data elements are non byte-sized data elements and wherein said packed trace data stream comprises one or more of said acceptance data elements and said means for packing is arranged to perform said packing such that said source data elements are recoverable from said packed trace data stream by means for analysing trace data.

39. Apparatus for processing data comprising means for receiving trace data for receiving a source trace data stream corresponding to a source trace protocol having a variable packet size, said source trace data stream comprising a plurality of packets of trace data, each of said plurality of packets comprising at least one source data element, said source data element having a bit-length corresponding to a highest common factor of bit-lengths of all possible packets of said source trace protocol;

means for packing arranged to receive said source data elements from said trace data receiver and to apply a packing protocol to said source data elements to pack said source data elements into a packed trace data stream for supply to trace accepting circuitry in a format comprising acceptance data elements, said acceptance data elements having a bit-length that is not a factor of said source data element bit-length;

wherein said packed trace data stream comprises one or more of said acceptance data elements wherein said packing circuitry is arranged to pack data of at least one of said source data elements into a respective data chunk having a bit-length that is not a factor of said acceptance data-element bit-length, said data chunk being formed such that a first portion of said data chunk comprises a number of bits of data of said source data elements and a further portion of said data chunk comprises a size indicating code specifying a number of bits of said source data elements contained within said data chunk and wherein said means for packing is arranged to perform said packing such that said source data elements are recoverable from said packed trace data stream by means for analysing trace data.

* * * * *